US007476995B2

(12) United States Patent
Uchiyama et al.

(10) Patent No.: US 7,476,995 B2
(45) Date of Patent: Jan. 13, 2009

(54) CENTRAL POWER DISTRIBUTING MEMBER FOR A BRUSHLESS MOTOR, A BRUSHLESS MOTOR PROVIDED THEREWITH AND A METHOD OF ASSEMBLING IT

(75) Inventors: Takahiro Uchiyama, Mie (JP); Izumi Suzuki, Mie (JP); Masashi Inoue, Saitama (JP); Tatsuro Horie, Saitama (JP); Akihiro Okamura, Saitama (JP)

(73) Assignees: Sumitomo Wiring Systems, Ltd. (JP); Honda Motor Co., Ltd. (JP)

( * ) Notice: Subject to any disclaimer, the term of this patent is extended or adjusted under 35 U.S.C. 154(b) by 0 days.

(21) Appl. No.: 11/477,172

(22) Filed: Jun. 28, 2006

(65) Prior Publication Data

US 2007/0004249 A1   Jan. 4, 2007

(30) Foreign Application Priority Data

Jun. 29, 2005   (JP)   ............................. 2005-189719

(51) Int. Cl.
*H05K 1/00*   (2006.01)
*H02K 3/50*   (2006.01)

(52) U.S. Cl. ........................ 310/71; 310/260; 310/179; 439/76.2

(58) Field of Classification Search .................. 310/71; 439/76.2; *H02K 3/50; H05K 1/00*
See application file for complete search history.

(56) References Cited

U.S. PATENT DOCUMENTS

| 6,011,339 | A  | * | 1/2000 | Kawakami ................... 310/208 |
| 6,856,057 | B2 | * | 2/2005 | Kobayashi et al. ............ 310/71 |
| 6,894,410 | B2 | * | 5/2005 | Kobayashi et al. ............ 310/71 |
| 7,034,419 | B2 | * | 4/2006 | Kabasawa et al. ............. 310/71 |
| 2004/0066103 | A1 | * | 4/2004 | Ohuchi et al. ................. 310/71 |
| 2004/0070293 | A1 | * | 4/2004 | Kabasawa et al. ............. 310/71 |
| 2004/0251752 | A1 | * | 12/2004 | Shinzaki et al. ............... 310/71 |

FOREIGN PATENT DOCUMENTS

| JP | 2003-134724 | 5/2003 |
| JP | 2004-080962 | 3/2004 |

\* cited by examiner

*Primary Examiner*—Dang D Le
*Assistant Examiner*—Naishadh N Desai
(74) *Attorney, Agent, or Firm*—Gerald E. Hespos; Anthony J. Casella

(57) ABSTRACT

A busbar (10) has a plurality of straight portions (14) circumferentially arranged at intervals. Several such busbars (10) are tied at a plurality of circumferential spaced positions by connecting the straight positions (14) in parallel with one another. The, the busbars (10) can be positioned with high precision and will not be circumferentially displaced from each other. This can avoid the deviation of intervals between the tabs (16) and those between terminals (18) from correct ones.

12 Claims, 7 Drawing Sheets

CENTRAL POWER DISTRIBUTING MEMBER FOR A BRUSHLESS MOTOR, A BRUSHLESS MOTOR PROVIDED THEREWITH AND A METHOD OF ASSEMBLING IT

BACKGROUND OF THE INVENTION

1. Field of the Invention

The invention relates to a central power distributing member for a brushless motor, preferably an automotive thin brushless motor, to a brushless motor provided therewith and to a method of assembling it.

2. Description of the Related Art

Japanese Unexamined Patent Publication No. 2003-134724 discloses an automotive thin brushless motor in which a ring-shaped stator encircles a rotor. The stator has magnetic poles made of coils and an annular central power distributing member supplies power to the magnetic poles. The distributing member has tying members that concentrically tie a plurality of ring-shaped busbars. Each busbar has tabs that connect with ends of the coils of the magnetic poles and a terminal to connect with a wire of a battery-side circuit. The busbars of the above-described central power distributing member are circular, and it is difficult to position the busbars circumferentially with high precision and intervals between the tabs and the terminals may deviate.

The invention was developed in view of the above problems and an object thereof is to enable busbars to be positioned substantially circumferentially from each other.

SUMMARY OF THE INVENTION

The invention relates to a central power distributing member for a brushless motor to supply power to coils of a stator. The central power distributing member has substantially ring-shaped busbars. Each busbar has at least one power supply terminal and tabs to be connected with the coils. Each busbar has substantially straight portions arranged circumferentially and positioned at intervals. The busbars are tied at a plurality of circumferentially spaced positions by connecting the substantially straight portions that are arranged substantially parallel. As a result, the busbars can be positioned with high precision without being displaced circumferentially from each other, and the intervals between the tabs and the terminals do not deviate from correct positions.

The busbars that form the central power distributing member preferably are tied to each other by clips preferably made of a synthetic resin.

The ring shape for each busbar preferably is formed by connecting the plurality of substantially straight portions at angles to each other.

Springback is very likely or unavoidable when a long and narrow metal material is bent into an arc. Thus, it is difficult to finish the arc of a highly precise curve. However, the busbars are formed from a plurality of substantially straight portions and can be bent with high precision.

The tabs preferably are formed by bending portions of the busbars to project in a folded state.

The tabs and the busbars are integral or unitary to each other. Thus, the number of parts can be reduced as compared to a case where tabs produced as parts separate from busbars are secured to the busbars.

Each busbar preferably is formed by bending a wire material that has at least one single-core wire covered by an insulation coating. Two connecting ends preferably have the insulation coating removed to expose the single-core wire, and the terminal can be connected electrically with the exposed sections of the single-core wire.

A filler preferably is filled at least partly into a space adjacent the connecting ends so that the connecting ends can be insulated from each other.

The busbars preferably are arranged substantially coaxially and are spaced apart at the given intervals along an axial direction.

The invention also relates to a brushless motor, and particularly an automotive thin brushless motor, that has the above-described central power distributing member for supplying power to coils of a stator.

The invention also relates to a method of assembling a central power distributing member for a brushless motor for supplying power to coils of a stator. The method comprises providing a plurality of substantially ring-shaped busbars each of which has at least one power supply terminal and tabs to be connected with the coils. The method proceeds by forming each busbar with a plurality of substantially straight portions, arranging the straight portions circumferentially at intervals, and tying the busbars at circumferentially spaced positions by connecting the substantially straight portions arranged in parallel.

The busbars are tied at the circumferentially spaced positions by connecting the straight portions that are arranged substantially in parallel. Thus, the busbars can be positioned with high precision without being displaced circumferentially from each other. Accordingly, intervals between the tabs and the terminals will not deviate from the correct intervals.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
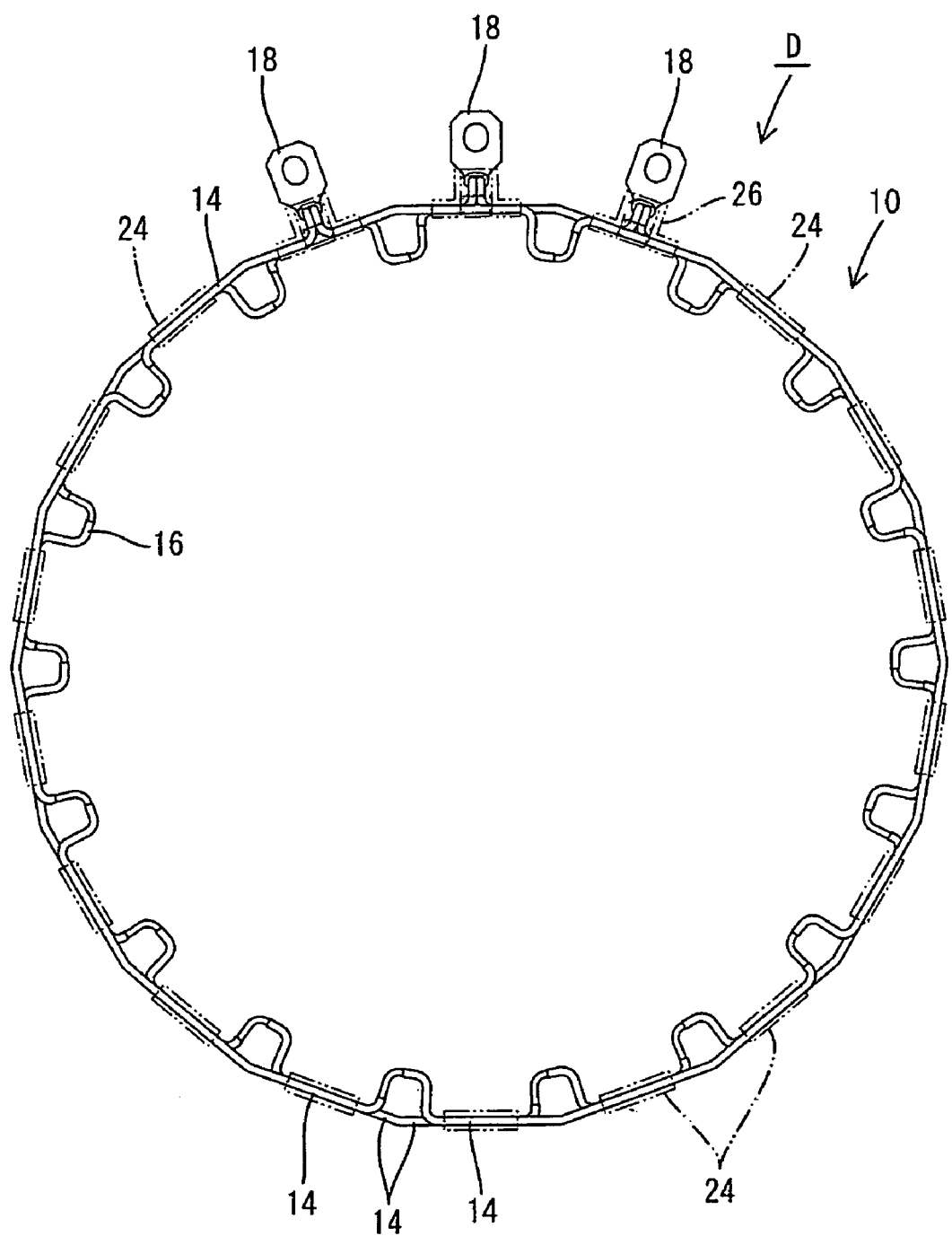
FIG. 1 is a front view of one embodiment.
Figure 2:
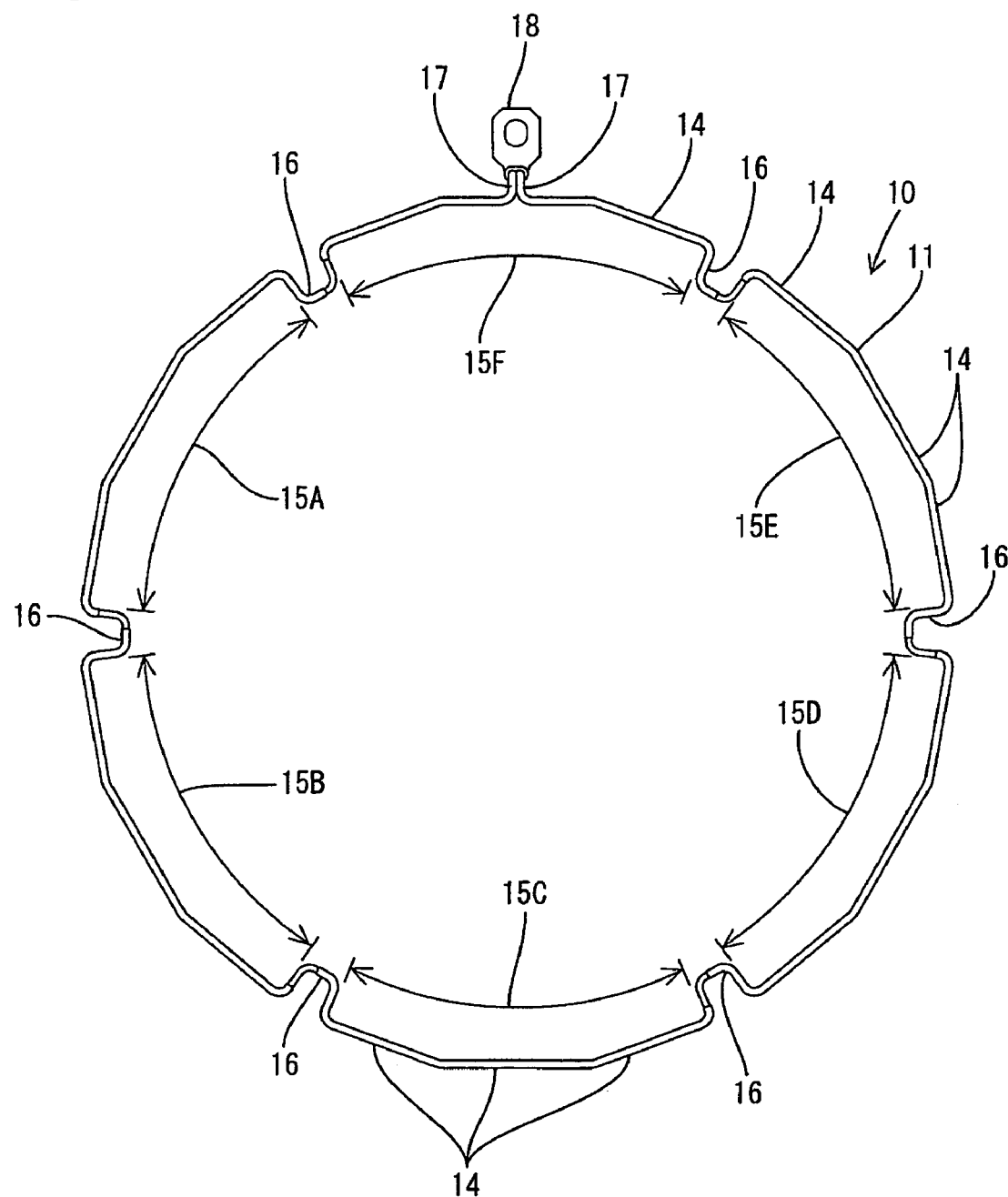
FIG. 2 is a front view of a busbar.
Figure 3:
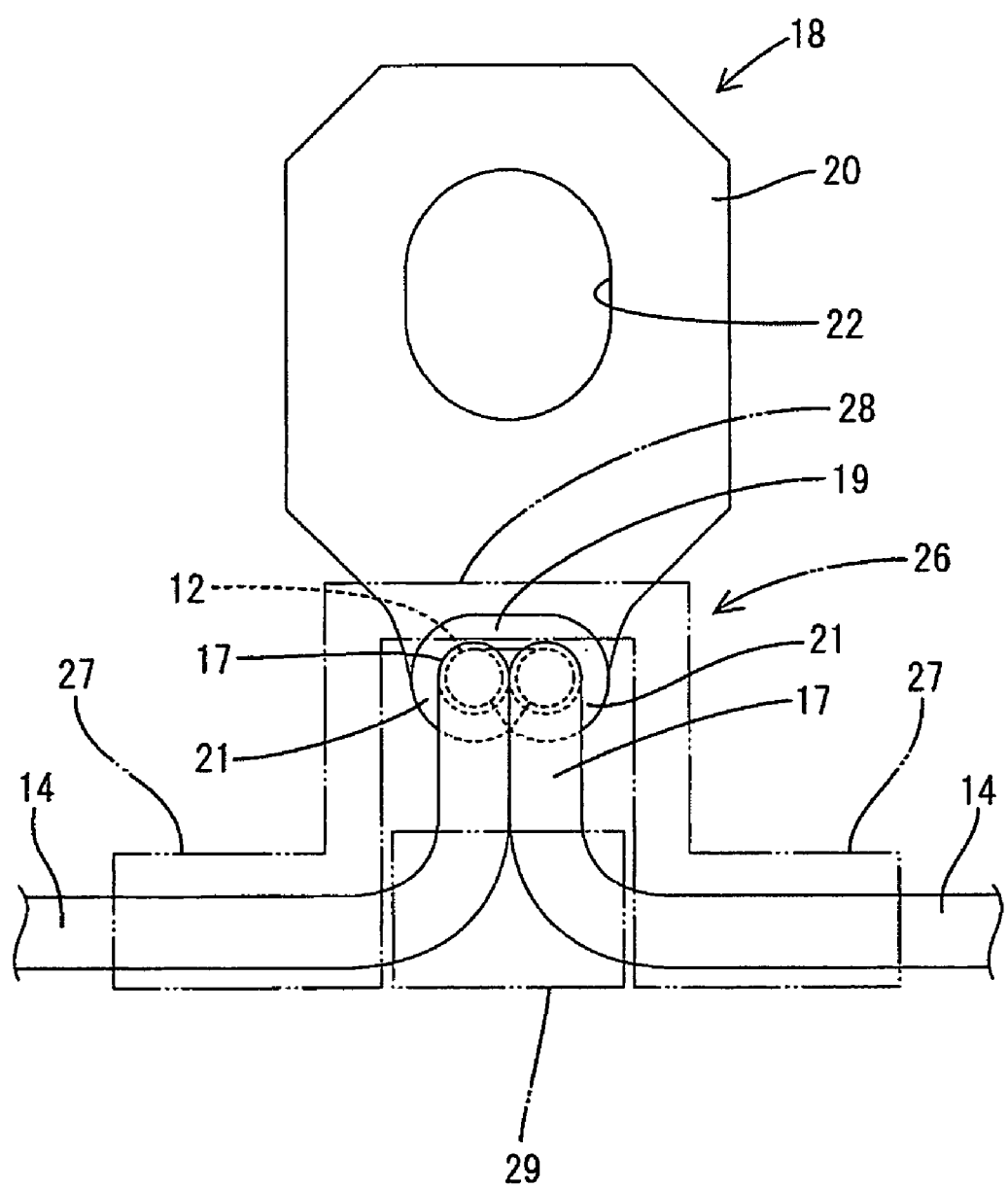
FIG. 3 is a partial enlarged front view showing a terminal.

A central power distributing member in accordance with the invention is identified by the letter D in FIGS. 1 to 7. The central power distributing member D is used with a motor that preferably is a three-phase alternating current brushless motor with a plurality of pairs of poles to be installed in a hybrid electric vehicle. The motor is to be disposed in a narrow space between an engine (not shown) and a transmission (not shown), and has a rotor (not shown) that is coupled substantially coaxially to a horizontal crankshaft (not shown) of the engine. A ring-shaped stator (not shown) substantially concentrically encircles the rotor, and the ring-shaped central power distributing member D substantially concentrically encircles the stator. The stator has a plurality of magnetic poles (not shown) formed by winding a coil around a core (not shown), and the magnetic poles are arranged at given intervals substantially along a circumference concentric with the rotor. The opposite ends of the coils are drawn substantially radially out toward the central power distributing member D from the respective magnetic poles.

The central power distributing member D is provided for supplying power to the coils of the stator, and, in this embodiment, includes three busbars 10, eighteen clips 24, 26 and three terminals 18.

Each busbar 10 is formed from a wire 11 that has a single conductive core 12 of substantially circular cross section and an insulation coating 13 that surrounds the core 12. The wire 11 is bent into a substantially right polygon shape with eighteen vertices. More specifically, each busbar 10 of this embodiment includes eighteen substantially straight portions 14, six tabs 16 and two connecting end portions 17.

Fifteen of the eighteen straight portions 14 are connected consecutively to one another in groups of three to define first to fifth straight-portion rows 15A to 15E. The straight portions 14 in each straight portion row 15A-15E are aligned to one another at an angle of substantially 160°. The first to fifth straight-portion rows 15A to 15E are connected one after another in this order by the tabs 16, and the adjacent straight-portion rows 15A to 15E are aligned at an angle of substantially at 160° to each other. The tabs 16 are bent in a substantially U-shape and project substantially radially in at the boundaries between the adjacent straight-portion rows 15A to 15E. At least part of the insulation coating 13 is removed from each tab 16 to expose the single-core wire 12, an end of the coil is connected electrically with the exposed section of the single-core wire by fusing or the like.

Figure 4:
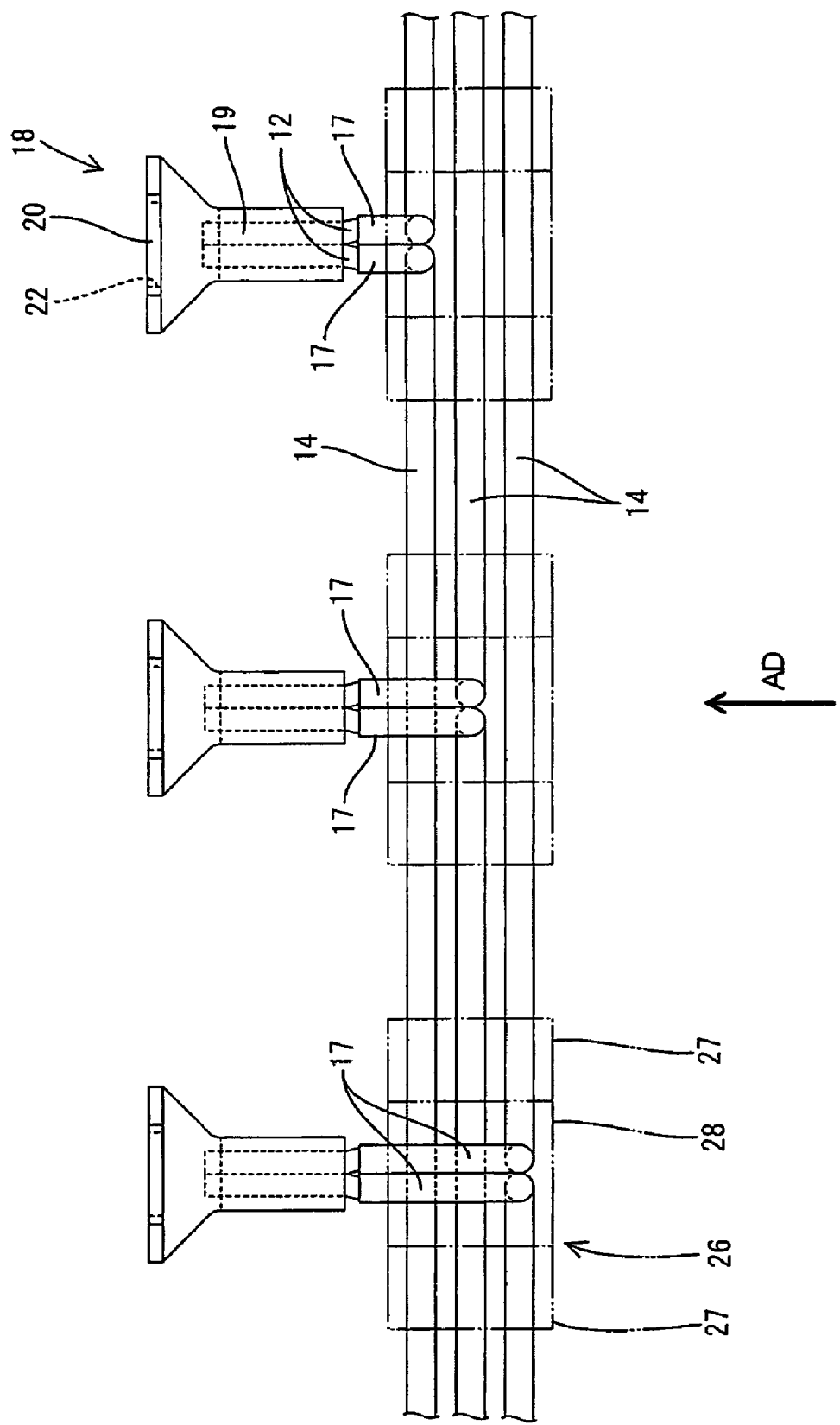
FIG. 4 is a partial enlarged plan view showing the terminal.
Figure 5:
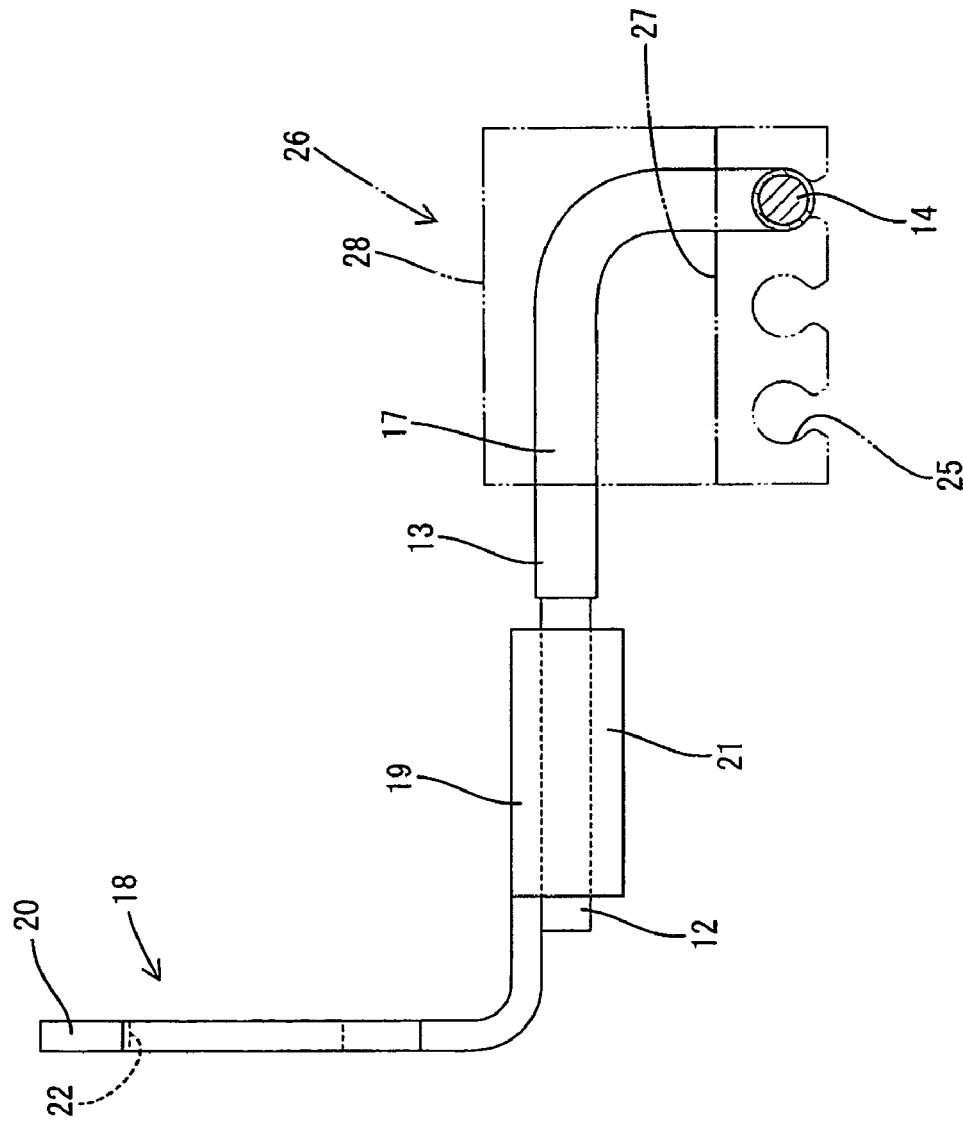
FIG. 5 is a partial enlarged side view showing the terminal.
Figure 6:
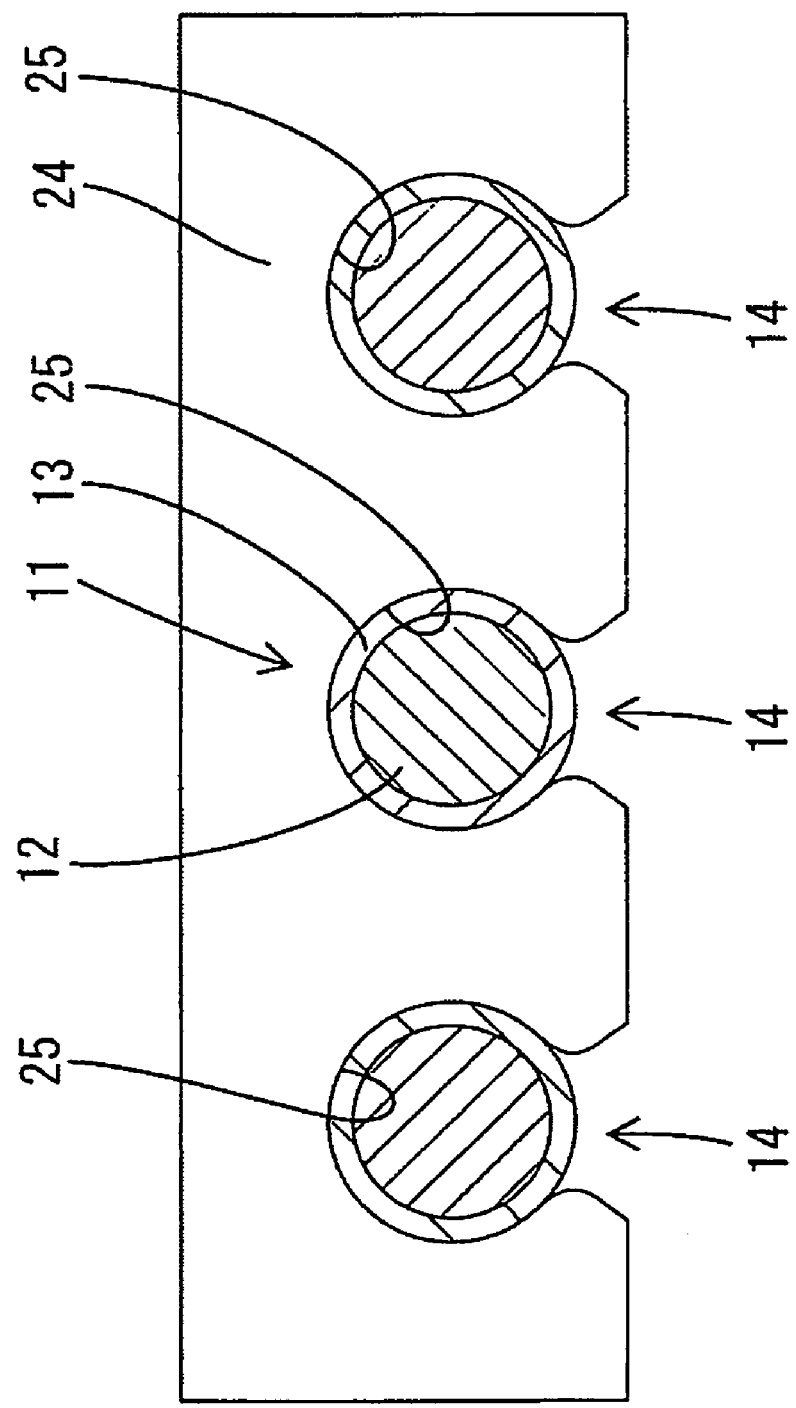
FIG. 6 is a partial enlarged section showing a tied portion of a clip and the busbars.
Figure 7:
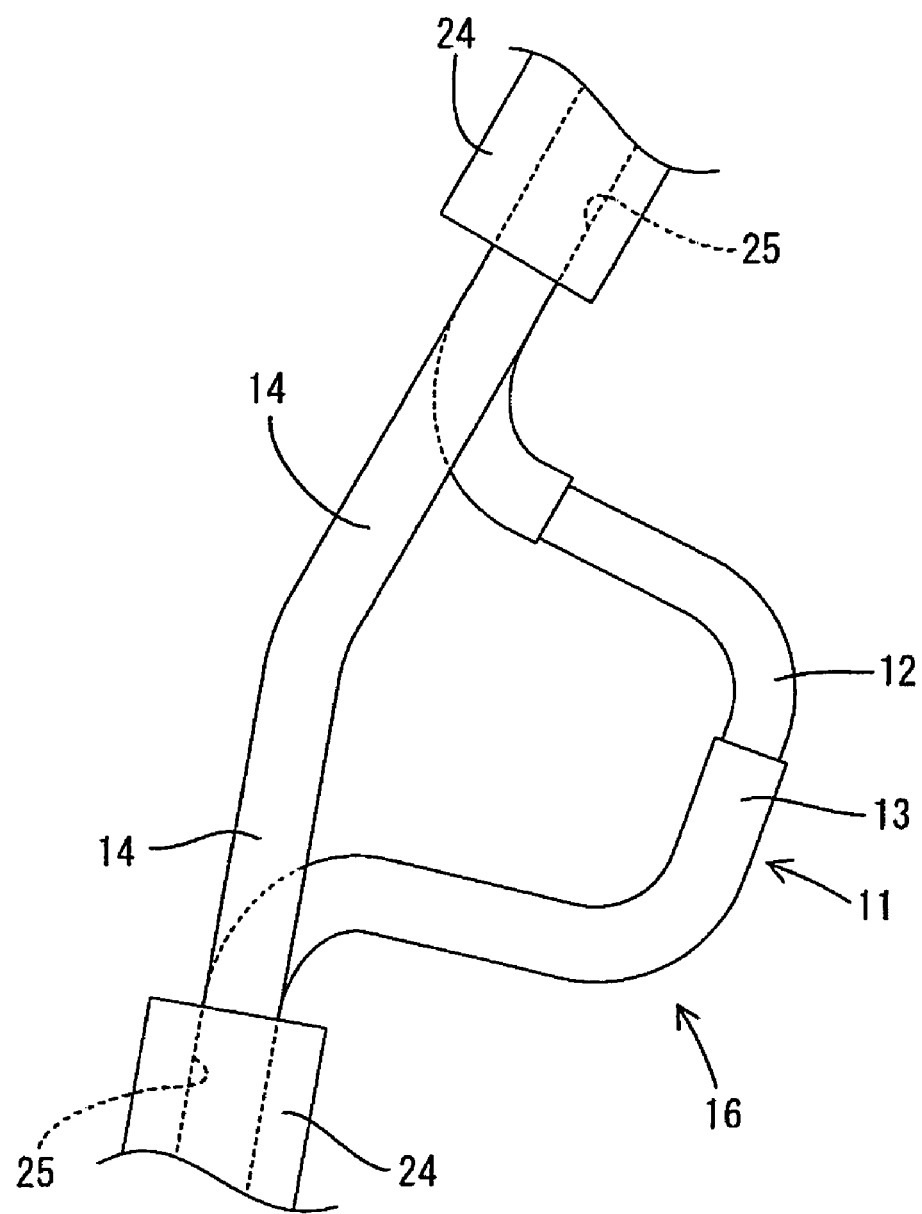
FIG. 7 is a partial enlarged front view of a tab.

The remaining three straight portions 14 are connected consecutively to one another at angles of substantially 160° to form a sixth straight-portion row 15F. Opposite ends of the sixth straight-portion row 15F are connected with the adjacent first and fifth straight-portion rows 15A, 15E via the tabs 16 that have substantially the same shape as the above-described tabs 16. Two connecting ends 17 extend substantially parallel and in close contact with each other from an intermediate part of the middle straight portion 14 of the sixth straight-portion row 15F. The two connecting ends 17 extend substantially radially out (up in FIGS. 2 and 3) and are then bent to extend substantially in an axial direction AD to define a substantially L-shape. As shown in FIG. 4, the extending lengths of the connecting end portions 17 differ depending on the busbars 10, considering that the busbars 10 are placed substantially one after another in the axial direction AD.

At least part of the insulation coating 13 is removed from the connecting ends 17 to expose the single-core wire 12, and the terminal 18 is connected electrically with the exposed sections of the single-core wire 12. The terminal 18 is made of a substantially L-shaped conductive metal sheet and has a connecting plate 19 aligned substantially parallel to the axial direction AD. A mounting plate 20 extends unitarily from the connecting plate 19 at an angle (e.g. a right angle). Two crimping pieces 21 extend from the substantially opposite lateral edges of the connecting plate 19 and are crimped into connection with the exposed sections of the single core wire 12 at the ends of the connecting ends 17. Thus, the single core wire 12 is squeezed between the connecting plate 19 and the crimping pieces 21 for secure connection to the terminal 18. A mount hole 22 penetrates the mounting plate 20 substantially in the axial direction AD. A wire (not shown) connected with an inverter (not shown) is to be connected with this mounting plate 20, and power is to be supplied to the busbar 10 via this mounting plate 20.

The lengths of the extending portions of the connecting ends 17 of the respective busbars 10 in the axial direction AD differ from each other as described above. Thus, the positions of the mounting plates 20 of all the busbars 10 substantially align with respect to the axial direction AD, as shown in FIG. 4, and the three busbars 10 are tied while being placed one after another along the axial direction AD in a specified positional relationship as described later.

The three busbars 10 are placed substantially coaxially one after another at given intervals substantially along the axial direction AD. Three kinds of synthetic resin clips 24, 26, 29 tie the three busbars 10. Each clip 24 is a substantially flat rectangular plate, and three substantially straight parallel holding grooves 25 are formed at specified intervals in one plate surface thereof. The holding grooves 25 have an arcuate cross section with an inner diameter that substantially equals the outer diameter of the busbars 10. Each terminal clip 26 has two substantially aligned flat plates 27 that are spaced apart from each other and a substantially U-shaped bent portion 28 extends integrally or unitarily between the end edges of the plates 27. Each plate 27 is formed with three holding grooves 25 that have substantially the same shape as the grooves 25 of the clips 24. Each inner clip 29 is a block or thick plate with unillustrated holding grooves for receiving the connecting ends 17.

The three busbars 10 are arranged substantially coaxially at the given intervals along the axial direction AD, and are positioned circumferentially so that the respective straight portions 14 are substantially parallel with each other. At this time, the terminals 18 are displaced circumferentially from each other a predetermined angle (substantially 20° in this embodiment). The tabs 16 are arranged at even intervals (substantially 20° in this embodiment), and the terminal 18 of each busbar 10 is positioned to correspond to intermediate parts of the two substantially parallel straight portions 14 of the other two busbars 10. Further, three straight portions 14 are substantially parallel and are arranged along the axial direction AD in each of the remaining fifteen areas where no terminal 18 is present.

The clips 24, 26, 29 are assembled between the tabs 16 adjacent to each other substantially along the circumferential direction. Specifically, each substantially plate-like clip 24 is assembled so that the holding grooves 25 receive the substantially parallel straight portions 14 from a radially outer side. Thus, the three respective straight portions 14 are held substantially in a parallel positional relationship by the substantially plate-like clips 24 at fifteen positions circumferentially offset from each other. Further, each terminal clip 26 is assembled to fit the bent portion 28 to the connecting ends 17 and to fit the holding grooves 25 to the three substantially parallel straight portions 14 from a radially outward side. Thus, the three straight portions 14 including the one 14 connected with the terminal 18 are held in a substantially parallel positional relationship by the terminal clip 26 at three circumferentially adjacent positions. Furthermore, each inner clip 29 is assembled to fit the holding grooves (not shown) thereof to the base ends of the connecting ends 17 and to close an inner opening of the bent portion 28 of the terminal clip 28. A filler of resin or the like is filled at least partly into a space enclosed by the bent portion 28 and the inner clip 29 to at least partly fill up a clearance between the connecting ends 17 located in this space. In this way, the connecting ends 17 are insulated from each other even if the insulation coating 13 is torn to expose the single-core wire 12 when the connecting end portions 17 are bent.

As described above, each busbar 14 is formed with a plurality of substantially straight portions 14 circumferentially arranged at specified intervals, and a plurality of busbars 10 are tied at a plurality of circumferentially spaced apart positions by connecting the straight portions 14 that have been arranged substantially in parallel. Thus, the busbars 10 can be positioned with high precision without being circumferentially displaced from each other, thereby avoiding a deviation of intervals between the tabs 16 and those between the terminals 18 from correct positions.

Springback is unavoidable if a long and narrow metal material is bent into an arc because a bending curvature generally lies close to or substantially within the range of resiliency limit. Therefore, it is difficult to finish the arc with a highly precise curvature. However, the busbar 10 is formed by successively connecting a plurality of substantially straight portions 14 at angles to each other. More particularly, the busbar 10 is formed only of a plurality of substantially straight portions 14, and is deformed plastically with bends that are sufficiently large to exceed the resiliency limit of the single-core wire 12. Therefore, the busbars 10 can be formed by bending with high precision and without being influenced significantly by springback.

The tabs 16 are formed by bending portions of the busbars to project in a folded manner (substantially V- or U-shaped) and, hence, the tabs 18 are unitary to the busbar 10. Thus, the number of parts can be reduced as compared to a case where the tabs 16 formed separate from the busbars 10 and are secured to the busbars 10.

The invention is not limited to the above described and illustrated embodiment. For example, the following embodiments are also embraced by the technical scope of the present invention as defined by the claims. Beside the following embodiments, various changes can be made without departing from the scope and spirit of the present invention as defined by the claims.

Although the busbars are comprised only of the substantially straight portions in the foregoing embodiment, the busbars may be formed such that a plurality of substantially straight portions and/or a plurality of arcuate portions are alternately connected with each other according to the invention.

The tabs are integral or unitary to the busbars in the foregoing embodiment. However, they may be separate from the busbars.

The busbars are formed by from wires in the foregoing embodiment. However, they may be formed from band- or strip-shaped materials.

The tabs are U-shaped in the foregoing embodiment. However, they may be substantially triangular or V-shaped, I-shaped, trapezoidal or arcuate.

Three busbars are provided in the foregoing embodiment. However, the number of the busbars can be two, four or more.

Six tabs are provided on each busbar in the foregoing embodiment. However, the invention is also applicable in cases with other than six tabs.

The insulation coating is removed to expose the single-core wire to connect the coil with the busbar in the foregoing embodiment. However, a wire with magnetic properties may be used for the busbar and a core wire may be connected with the coil while an insulation coating is fused during connection.

A wire material with a single-core wire covered by an insulation coating is used as the busbar in the foregoing embodiment. However, a wire material in which a single-core wire is exposed without being covered by an insulation coating may be used according to the present invention.

The three-phase alternating current motor with six pairs of poles is used in the foregoing embodiment, and the circumferentially adjacent straight portions are at about 160° to each other. However, the busbar can have an optimal polygonal shape depending on the number of poles of the motor and whether an alternating current or a direct current is applied.

The clips are mounted on all straight portions in the foregoing embodiment. However, the number of the clips may be a minimum necessary number to hold the busbars.

The busbars need not be tied by clips, and can be tied by other means such as by co-molding a resin block to the busbars, by fusing at least part of the busbars to each other, gluing, clamping or the like.

What is claimed is:

1. A central power distributing member for a brushless motor for supplying power to coils of a stator, the central power distributing member comprising:
   a plurality of substantially ring-shaped busbars each of which is formed by bending a single wire that has a single-core covered by an insulation coating, the wire of each of said busbars having opposite ends connected to a power supply terminal and tabs to be connected with the coils, the wire of each busbars being bent to define a substantial polygonal shape with a plurality of substantially straight portions circumferentially arranged at intervals and bends between circumferentially adjacent straight portions, each of the straight portions extending circumferentially a greater distance than the bends adjacent thereto; and
   the plurality of busbars being tied at a plurality of circumferentially spaced apart positions by connecting the substantially straight portions arranged substantially in parallel.

2. The central power distributing member of claim 1, wherein the busbars are tied to each other to form the central power distributing member by clips made of a synthetic resin.

3. The central power distributing member of claim 1, wherein the tabs are formed by bending portions of the busbars to project in a folded state.

4. The central power distributing member of claim 1, wherein a pair of connecting ends have the insulation coating at least partly removed to expose the at least one single-core wire, and the terminal is connected electrically with the exposed sections of the single-core wire.

5. The central power distributing member of claim 4, wherein a filler is filled at least partly into a space adjacent to the connecting ends so that the connecting ends can be insulated from each other.

6. The central power distributing member of claim 1, wherein the busbars are substantially coaxially arranged at intervals along an axial direction.

7. A brushless motor comprising the central power distributing member of claim 1 for supplying power to coils of a stator.

8. The central power distributing member of claim 1, wherein each of the bends between the circumferentially adjacent straight portions of each of the busbars is sufficiently large to exceed a resiliency limit of the single-core wire for substantially preventing springback.

9. The central power distributing member of claim 8, wherein each of the bends defines an angle of approximately 160°.

10. The central power distributing member of claim 8, wherein the tabs are formed by bending portions of the busbars to define a substantially U-shape projecting inwardly relative the respective ring-shaped busbar, each of the tabs including a plurality of bends exceeding the bend angles between the straight portions of each of the busbars for substantially preventing springback.

11. The central power distributing member of claim 1, wherein the busbars are tied to each other by clips made of synthetic resin, the clips being mounted to the straight portions of the respective busbars between the bends of the respective busbars.

12. The central power distributing member of claim 10, wherein each of the busbars has at least one clip mounted to substantially straight portions of the respective busbar adjacent to the power supply terminal thereof.

* * * * *